United States Patent [19]

Mukai et al.

[11] 4,236,621
[45] Dec. 2, 1980

[54] APPARATUS FOR PROTECTING A COMPRESSOR FROM BREAKDOWN

[75] Inventors: Takamitu Mukai; Tomoo Fujii; Hiroya Kouno, all of Kariya, Japan

[73] Assignee: Kabushiki Kaisha Toyoda Jidoshokki Seisakusho, Aichi, Japan

[21] Appl. No.: 33,136

[22] Filed: Apr. 25, 1979

[30] Foreign Application Priority Data

Apr. 28, 1978 [JP] Japan ............................. 53-58500[U]

[51] Int. Cl.³ .............................................. F16D 19/00
[52] U.S. Cl. .................................. 192/82 T; 62/228.1; 361/104; 417/319
[58] Field of Search ............... 361/104, 25; 62/323 C, 62/228 R, 127; 417/32, 319; 337/403, 404; 310/68 C; 192/82 T

[56] References Cited

U.S. PATENT DOCUMENTS

| 361,273 | 4/1887 | Easton | 310/68 C X |
|---|---|---|---|
| 1,075,882 | 10/1913 | Walters et al. | 310/68 C X |
| 1,426,206 | 8/1922 | Lybeck | 417/32 |
| 2,143,085 | 1/1939 | Persons et al. | 310/68 C |
| 2,514,693 | 7/1950 | Chapman | 310/68 C X |
| 2,518,597 | 8/1950 | Brooks | 417/32 X |
| 2,767,285 | 10/1956 | Kosak, Jr. | 361/25 X |
| 3,232,519 | 2/1966 | Long | 417/32 X |
| 3,702,064 | 11/1972 | Ciolli | 62/228 X |
| 3,759,058 | 9/1973 | Jacobs | 62/323 C X |
| 3,959,984 | 6/1976 | Vlasak | 361/104 X |

*Primary Examiner*—Albert J. Makay
*Assistant Examiner*—William E. Tapolcai
*Attorney, Agent, or Firm*—Burgess, Ryan and Wayne

[57] ABSTRACT

An apparatus for protecting a compressor from breakdown, in the case where the compressor is arranged so as to be connected to a drive source by means of an electromagnetic clutch having therein an excitation circuit connected, at its one end, to electric power source, and at its other end, to a body of the compressor via a grounding lead wire, which is characterized in that the grounding lead wire is connected to the body of the compressor by means of an electrically conductive connecting member made of a material which is capable of melting under a thermal effect of the compressor when the compressor is overheated.

6 Claims, 5 Drawing Figures

APPARATUS FOR PROTECTING A COMPRESSOR FROM BREAKDOWN

FIELD OF THE INVENTION

The present invention relates to an apparatus for protecting a compressor from breakdown. More particularly, the present invention relates to an apparatus for protecting a vehicle air conditioning compressor from breakdown, which is caused by seizure of the sliding parts of the compressor when the sliding parts suffer from lack of lubrication.

BACKGROUND OF THE INVENTION

Generally, in an air conditioning system for vehicles, a compressor for compressing refrigerant is arranged to be driven by a vehicle engine through an electromagnetic clutch. The electromagnetic clutch is provided with an electric excitation circuit in which a grounded lead wire is connected to the body of the compressor. In the interior of some conventional vehicle air conditioning compressors, sliding parts are lubricated by a lubricating oil which is supplied from an oil stocker provided within the body of the compressor or which is separated from an oil suspended refrigerant flowing through the entire air conditioning circuit, including the compressor, distribution pipes, and a heat exchanger. In some other conventional compressors for air conditioning of vehicles, the sliding parts thereof are lubricated by a part of the refrigerant per se, which contains therein an oil component. However, when the conventional compressor is continually operated, regardless of the fact that a leakage of a lubricating oil or a refrigerant from the air conditioning circuit including the compressor occurs, there is a lack of lubrication for the sliding parts of the compressor. That is to say, if a leakage of lubricating oil occurs, a shortage of the lubricating oil takes place, thereby causing a lack of lubrication for the sliding parts of the compressor. Further, if a leakage of refrigerant occurs, a shortage of the refrigerant, which carries a lubricating oil to the sliding parts of the compressor, takes place, thereby causing a lack of lubrication for the sliding parts of the compressor. As a result, seizure of the sliding parts of the compressor eventually occurs, which brings about a breakdown of the compressor.

SUMMARY OF THE INVENTION

An object of the present invention is to provide an apparatus for protecting a vehicle air conditioning compressor from breakdown caused by seizure of the sliding parts of the compressor.

According to the present invention, there is provided means for preventing an electromagnetic clutch, which connects a vehicle air conditioning compressor to an engine system of the vehicle, from being excited by an electric power source prior to occurence of seizure of the sliding parts of the compressor, so that the operation of the compressor is eventually stopped. The above-mentioned preventing means of the apparatus of the present invention is a thermally meltable conductor provided in a grounded circuit of an electric excitation circuit for the electromagnetic clutch. The thermally meltable conductor is disposed adjacent to a body of the compressor, so that the conductor is thermally melted and cuts the electric excitation circuit when there is a lack of lubrication for sliding parts of the compressor and when the temperature of the body of the compressor reaches a predetermined level due to friction heat generated in the sliding parts of the compressor. Preferably, the thermally meltable conductor consists of a thermally meltable metal alloy connecting an electric lead wire of the grounded circuit of the electric excitation circuit for the electromagnetic clutch to the body of the compressor.

The present invention will become more readily apparent from the ensuing description with reference to the accompanying drawings wherein.

Figure 1:
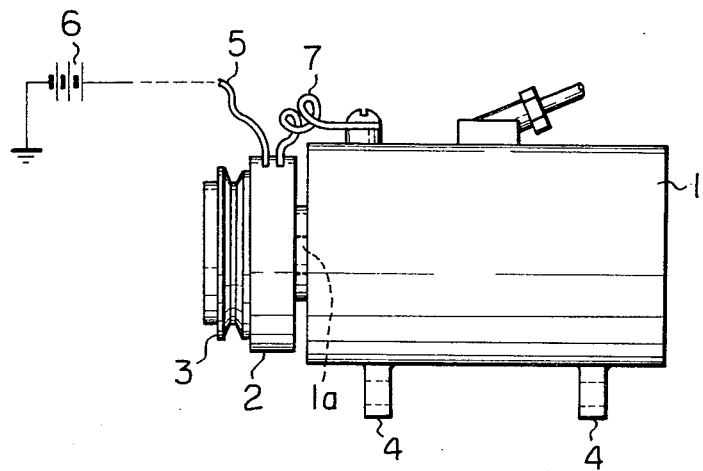
FIG. 1 is a front view of a vehicle air conditioning compressor provided with a protecting apparatus according to the present invention.

Referring to FIGS. 1 through 5, a body 1 of a vehicle air conditioning compressor is provided, at its one end, with an outwardly extending drive shaft 1a which is capable of being connected to and disconnected from a pulley 3 driven by an outer drive source, such as a vehicle engine, by means of an electromagnetic clutch 2. The body 1 of the compressor is fixed to the engine or a body of the vehicle by means of flanges 4. An end of an exciting coil of the electromagnetic clutch 2 is connected to an electric power source 6, such as a vehicle battery, via a lead wire 5 and diverse kinds of controllers (not shown). The other end of the exciting coil is connected to a part of the body 1 of the compressor via a lead wire 7. It is preferred that the part of the body 1 to which the other end of the exciting coil is connected, is one chosen from parts of the body 1 which are disposed adjacent to a refrigerant discharge port of the compressor, and are relatively readily subjected to heat which is generated in the interior of the compressor during the operation of the compressor. It should, however, be noted, that the connection of the lead wire 7 to the body 1 of the compressor is accomplished by a connecting member 8a, 8b, or 8c, which is arranged in an adjacent to the above-mentioned part of the body 1 to which the other end of the exciting coil is connected. It should further be noted, that the connecting member 8a, 8b, or 8c is made of a material which readily melts under the effect of heat radiating or transmitted from the body 1 of the compressor when the compressor reaches an unusually high temperature.

FIGS. 2 through 5 illustrate three preferred connecting structures in which the connection of the lead wire 7 to the body 1 of the compressor is accomplished by the use of the thermally meltable connecting member 8a, 8b, or 8c.

Figure 2:
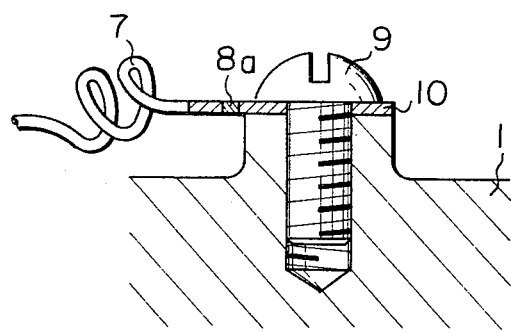
FIG. 2 is an enlarged partial view of FIG. 1, illustrating an important part of the apparatus according to an embodiment of the present invention.
Figure 3:
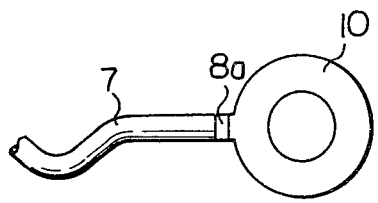
FIG. 3 is a plan view of the part illustrated FIG. 2.
Figure 4:
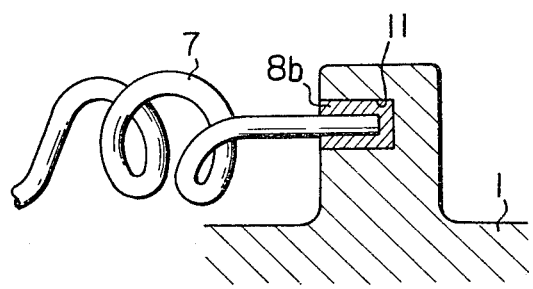
FIG. 4 is a similar view to FIG. 2, illustrating an important part of the apparatus according to another embodiment of the present invention.
Figure 5:
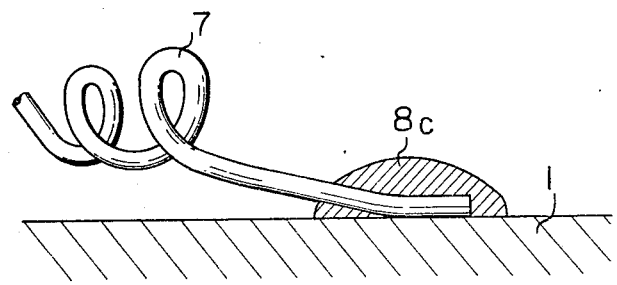
FIG. 5 is a similar view of FIG. 2, illustrating an important part of the apparatus according to a further embodiment of the present invention.

In the first connecting structure illustrated, in FIGS. 2 and 3, the lead wire 7 for electric earth (ground) is connected, via the connecting member 8a, to a connecting piece 10, which is made of a material of good electric and thermal conductivity and is fixed by a screw 9 to the body 1 of the compressor. The connecting member 8a is arranged apart from and adjacent to the part of the body 1 of the compressor where the connecting piece 10 is fixed to the body 1. In the second and third connecting structures illustrated in FIGS. 4 and 5, the connection of the lead wire 7 to the body 1 of the compressor is accomplished by the connecting member 8b or 8c which is directly attached to the body 1 of the compressor. More specifically, in the second connecting structure illustrated in FIG. 4, an end of the lead wire 7 is inserted into a recess 11 formed in the body 1 of the compressor, and the recess 11 is filled with the connecting member 8b, which is hard within a usual temperature range below a melting temperature at which the connecting member 8b starts to melt. In the third connecting structure illustrated in FIG. 5, an end of the lead wire 7 for electric earth is brazed to the surface of the body 1 of the compressor by means of the connecting member 8c.

In the above-mentioned three connecting structures, it should be noted that, the material of the connecting member 8a, 8b or 8c must have such a property that the material begins to melt at a temperature slightly higher than the highest temperature of the body 1 of the compressor during the usual operation of the compressor. Therefore, if the highest temperature of the body 1 of the compressor is a temperature within the range of 110 through 120 degrees centigrade, the material of the connecting member 8a, 8b, or 8c must be selected from materials melting at a temperature within the range of 130 through 150 degrees centigrades. Typical materials having the property of melting at a temperature within the above-mentioned range are, for example: an alloy of 25.0 percent bismuth, 50 percent lead and 25 percent tin, having a melting point of 149 degrees centigrade; an alloy of 56.2 percent bismuth, 2.0 percent lead, 40.7 percent tin, 0.7 percent cadminum and 0.4 percent indium, having a melting point of 124 through 130 degrees centigrade; and alloy of 5.0 percent bismuth, 32.0 percent lead, 45.0 percent tin, and 180 percent cadmium, having a melting point of 132 through 139 degrees centigrade; an alloy of 57.0 percent bismuth and 43.0 percent tin, having a melting point of 138.5 degrees centigrade, and; an alloy of 30.6 percent lead, 51.2 percent tin, and 18.2 percent cadmium, having a melting point of 143 degrees centigrade.

The operation of the protecting apparatus for a compressor according to the present invention will now be described.

During the usual and normal operation of the compressor, an electric current is supplied from the electric power source 6 to the exciting coils of the electromagnetic clutch 2 through the lead wire 5 and the grounded lead wire 7, so that the electromagnetic clutch 2 is energized. Therefore, the drive shaft of the compressor is connected to the pulley 3, and the compressor is ready to be driven by the drive source, such as a vehicle engine.

In the case where a lack of an appropriate lubrication for the sliding parts of the compressor occurs, due to the occurrence of leakage of the refrigerant or the lubricating oil from the air conditioning circuit including the compressor per se, or due to some other causes, the sliding parts perform abnormal frictional motions generating frictional heat by which the temperature of the body 1 of the compressor becomes unusually high. As a result, the connecting member 8a, 8b or 8c melts under the effect of heat transmitted from the body 1 of the compressor, so that the lead wire 7 is disconnected from the body 1 of the compressor. Consequently, the supply of the electric current from the source 6 to the exciting coils of the electromagnetic clutch 2 is stopped. Therefore, the electromagnetic clutch 2 is de-energized and disconnects the drive shaft of the compressor from the drive pully 3. Thus, the operation of the compressor is automatically stopped. At this stage, the grounded lead wire 7 is formed into a coil spring shape or if the grounded lead wire 7 is supplied, by an appropriate resilient member, with a spring force acting so as to urge said lead wire 7 in the direction moving away from the body 1 of the compressor, the disconnection of the lead wire 7 from the body 1 of the compressor takes place with certainty. This fact ensures the automatic stoppage of the operation of the compressor.

When the connecting member 8a, 8b or 8c melts and, as a result, the operation of the compressor is stopped, it is naturally impossible to re-start the operation of the compressor, until the re-connection of the lead wire 7 to the body 1 of the compressor is established by the usage of a new connecting member 8a, 8b, or 8c. From this fact, it is ensured that the sliding parts of the compressor are prevented from seizure.

After the stoppage of the operation of the compressor, and investigation of the cause or causes for the unusually high temperature of the compressor is carried out. Therefore, an appropriate treatment for eliminating the cause or causes is conducted. After the treatment, the connection of the grounding lead wire 7 to the body 1 of the compressor is recovered by the usage of a new connecting member 8a, 8b or 8c. Thus, the usual and normal operation of the compressor can be re-started. At this stage, it should be appreciated that if an operator touches the lead wire 7 with his hand, there is no danger, since an electric voltage drop takes place in the exciting coils of the electromagnetic clutch 2.

From the foregoing description of the three preferred embodiments of the present invention, it will be understood that, since the protecting apparatus of the present invention can prevent the seizure of the sliding part of the compressor, an unexpected breakdown of the compressor can be avoided. Therefore, the long life of the compressor is guaranteed. Further, since the structure of the protecting apparatus for compressor, according to the present invention, is very simple, the apparatus per se can be of very low cost, and the reliability thereof is very high.

What is claimed is:

1. An apparatus for protecting a vehicle air conditioning compressor, having therein sliding parts to be lubricated during the operation of said compressor, against breakdown due to seizure of the sliding parts, said compressor being connected to a vehicle engine system via an electromagnetic clutch excited from a vehicle battery, comprising means for preventing said electromagnetic clutch from being excited prior to occurrence of the seizure of said sliding parts of said compressor, said preventing means being a thermally meltable conductor provided in a grounded circuit of an electric excitation circuit for said electromagnetic clutch, said thermally meltable conductor comprising a lead wire disposed adjacent to a body of said compressor, said lead wire having a resilient portion formed into a coil spring for urging said lead wire away from said body when said conductor is melted.

2. Apparatus according to claim 1, wherein said thermally meltable electric conductor is made of a metallic material selected from an alloy of 25.0 percent bismuth, 50 percent lead and 25 percent tin, an alloy of 56.2 percent bismuth, 2.0 percent lead, 40.7 percent tin, 0.7 percent cadminum and 0.4 percent indium, an alloy of 5.0 percent bismuth, 32.0 percent lead, 45.0 percent tin, and 18.0 percent cadmium, an alloy of 57.0 percent bismuth, and 43.0 percent tin, and an alloy of 30.6 percent lead, 51.2 percent tin, and 18.2 percent cadmium.

3. Apparatus for protecting a compressor having an electrically and thermally conductive body from breakdown as a result of excessive friction and heat generation therein, the compressor being adapted for connection to a drive means through an electromagnetic clutch, comprising:

an excitation circuit for said clutch, said circuit including a connection to the body of said compressor, an electromagnetic clutch actuating means, and a lead wire electrically coupled in series with said actuating means, and having one end connected thereto;

a recess in the surface of said compressor body;

a normally solid mass of an electrically conductive alloy having a predetermined melting point disposed in said recess, said melting point being slightly higher than the highest normal operating temperature of said compressor, the other end of said lead wire being immersed in, electrically coupled to, and mechanically secured by said mass, said lead wire having a resilient portion between said ends, said resilient portion being formed into a coil spring for urging said other end away from said body when said mass is melted, whereby said mass may melt, releasing said other end of said lead wire and causing said clutch to disengage when said normal operating temperature of said compressor is exceeded.

4. The apparatus according to claim 3, wherein said normal operating temperature is in the range of 130° C. to 150° C.

5. Apparatus for protecting a compressor from breakdown, the compressor being arranged so as to be connected to a drive source by means of an electromagnetic clutch having therein an excitation circuit connected, at its one end, to an electric power source, and at its other end, to a body of said compressor via a grounding lead wire, wherein said grounding lead wire is connected to said body of said compressor by means of an electrically conductive connecting member made of a material which is capable of melting under a thermal effect of said compressor when said compressor is overheated, a resilient portion of said grounding lead wire being formed into a coil spring for urging said grounding lead wire to move away from said body when said connecting member is melted.

6. Apparatus according to claim 5, wherein said material of said connecting member is selected from (i) an alloy of 25.0 percent bismuth, 50 percent lead and 25 percent tin, (ii) an alloy of 56.2 percent bismuth, 2.0 percent lead, 40.7 percent tin, 0.7 percent cadmium and 0.4 percent indium, (iii) an alloy of 5.0 percent bismuth, 32.0 percent lead, 45.0 percent tin, and 18.0 percent cadmium, (iv) an alloy of 57.0 percent bismuth, 43.0 percent tin, and (v) an alloy of 30.6 percent lead, 51.2 percent tin, and 18.2 percent cadmium.

* * * * *